(12) United States Patent
Yang et al.

(10) Patent No.: US 8,965,303 B2
(45) Date of Patent: Feb. 24, 2015

(54) QUAD-BAND TUNABLE DIVERSITY ANTENNA FOR GLOBAL APPLICATIONS

(71) Applicant: Motorola Solutions, Inc., Schaumburg, IL (US)

(72) Inventors: Guangli Yang, Bellport, NY (US); Sarika Jain, Vernon Hills, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 74 days.

(21) Appl. No.: 13/923,551

(22) Filed: Jun. 21, 2013

(65) Prior Publication Data
US 2014/0378074 A1    Dec. 25, 2014

(51) Int. Cl.
*H04B 1/40* (2006.01)
*H04B 7/08* (2006.01)

(52) U.S. Cl.
CPC ............... *H04B 1/40* (2013.01); *H04B 7/0802* (2013.01)
USPC ............. 455/77; 455/78; 455/101; 455/550.1

(58) Field of Classification Search
USPC .................. 455/77, 78, 101, 550.1, 552.1
See application file for complete search history.

(56) References Cited

U.S. PATENT DOCUMENTS

| | | | |
|---|---|---|---|
| 6,114,996 A | 9/2000 | Nghiem et al. | |
| 6,456,249 B1 | 9/2002 | Johnson et al. | |
| 6,614,400 B2 | 9/2003 | Egorov et al. | |
| 6,728,517 B2 * | 4/2004 | Sugar et al. | 455/73 |
| 7,053,841 B2 | 5/2006 | Ponce De Leon et al. | |
| 7,345,634 B2 | 3/2008 | Ozkar et al. | |
| 7,424,308 B2 * | 9/2008 | Suzuki | 455/552.1 |
| 7,477,196 B2 | 1/2009 | Asrani et al. | |
| 7,680,510 B2 * | 3/2010 | Crocker et al. | 455/553.1 |
| 7,683,840 B2 | 3/2010 | Lin et al. | |
| 7,696,928 B2 | 4/2010 | Rowell et al. | |
| 7,899,410 B2 * | 3/2011 | Rakshani et al. | 455/78 |
| 8,463,214 B2 * | 6/2013 | Yen et al. | 455/133 |
| 2007/0200766 A1 | 8/2007 | McKinzie et al. | |
| 2008/0266190 A1 | 10/2008 | Ohba et al. | |
| 2012/0322393 A1 | 12/2012 | Lindberg et al. | |

FOREIGN PATENT DOCUMENTS

| | | |
|---|---|---|
| CN | 1695267 B | 8/2011 |
| EP | 2405534 A1 | 1/2012 |
| WO | 2010070636 A1 | 6/2010 |

* cited by examiner

*Primary Examiner* — Nhan Le (57) ABSTRACT

An electronic device includes a main antenna and a diversity antenna. The diversity antenna includes a first portion configured to enable a transceiver to receive a signal in a first low-band frequency of four frequency bands. A second portion enables the transceiver to receive a signal in first and second high-band frequencies. A third portion is RF coupled to the first portion when the third portion is connected to ground. The third portion tunes the first portion such that the transceiver receives a signal in a second low-band frequency. A switch is connected between the third portion and the ground. When the switch is open, the first portion enables the transceiver to receive the signal in the first low-band frequency. When the switch is closed, the third portion tunes the first portion to enable the transceiver to receive the signal in the second low-band frequency.

20 Claims, 7 Drawing Sheets

TABLE 600

| ANTENNA | FREQUENCY BAND | | FREE SPACE EFFICIENCY (%) SWITCH (GND) | | FREE SPACE EFFICIENCY (%) SWITCH (OPEN) | |
|---|---|---|---|---|---|---|
| DIV ANTENNA | LTE B17 | RX | 734 | 21 | 19 | -7.16 |
| | | | 740 | 21 | 21 | -6.84 |
| | | | 746 | 21 | 21 | -6.88 |
| | | WORST CASE | | 21 | 19 | -7.16 |
| | | AVERAGE | | 21 | 20 | -6.96 |
| | LTE B13 | RX | 746 | 21 | 20 | -6.94 |
| | | | 751 | 21 | 19 | -7.29 |
| | | | 756 | 21 | 17 | -7.82 |
| | | WORST CASE | | 21 | 17 | -7.82 |
| | | AVERAGE | | 21 | 18 | -7.33 |
| | 850 | RX | 869 | 18 | 18 | -7.51 |
| | | | 881 | 18 | 17 | -7.81 |
| | | | 894 | 18 | 16 | -8.03 |
| | | WORST CASE | | 18 | 16 | -8.03 |
| | | AVERAGE | | 18 | 17 | -7.78 |
| | 1900 | RX | 1930 | 29 | 22 | -6.59 |
| | | | 1960 | 29 | 23 | -6.38 |
| | | | 1990 | 29 | 26 | -5.85 |
| | | WORST CASE | | 29 | 22 | -6.59 |
| | | AVERAGE | | 29 | 24 | -6.26 |
| | 2100 | RX | 2110 | 29 | 22 | -6.58 |
| | | | 2140 | 29 | 22 | -6.51 |
| | | | 2170 | 29 | 21 | -6.86 |
| | | WORST CASE | | 29 | 21 | -6.86 |
| | | AVERAGE | | 29 | 22 | -6.65 |

QUAD-BAND TUNABLE DIVERSITY ANTENNA FOR GLOBAL APPLICATIONS

BACKGROUND OF THE INVENTION

A mobile unit (MU) may be configured with a transceiver to communicate with a network. The transceiver is coupled to a main antenna such that the transceiver is capable of connecting to the network on a particular operating frequency of the network. Accordingly, the main antenna is designed to transmit/receive signals from the transceiver to the network on the operating frequency. For example, a cellular network which is based upon a Global System for Mobiles (GSM) network is utilizing a high-band frequency of 1900 MHz. In another example, a cellular network which is based upon a Code Division Multiple Access (CDMA) network is utilizing a high-band frequency of 1800 MHz. In yet another example, a low-band frequency ranging between 800-900 MHz may also be used such as in cellular networks. Therefore, the antenna allows the transceiver to operate on these frequencies.

A conventional MU may include a respective main antenna for each operating frequency, thereby enabling the transceiver to transmit/receive signals in different networks. That is, the MU may include a first main antenna to operate in the GSM network, a second main antenna to operate in the CDMA network, and a third main antenna to operate in the cellular network. However, this requires multiple main antennas to be disposed within the housing of the MU, each main antenna requiring respective connections/components.

In certain environments such as urban or indoor environments, there is no clear line-of-sight (LOS) between a transmitter and a receiver of the wireless link. Accordingly, the signal is transmitted from the transmitter to be reflected along multiple paths before finally being received by the receiver. Each of these bounces introduces phase shifts, time delays, attenuations, and distortions that can destructively interfere with one another at the aperture of the receiving antenna. Therefore, the conventional MU may further utilize different types of antenna arrangements that enable the transceiver to operate on the above described frequencies. Specifically, an antenna diversity scheme may be used. The antenna diversity scheme relates to the use of two or more antennas to improve the quality and reliability of a wireless link. For example, the antenna diversity scheme may relate to a spatial diversity, a pattern diversity, a polarization diversity, a transmit/receive diversity, adaptive arrays, etc. in which multiple antennas are utilized. Antenna diversity is especially effective at mitigating the above-described multipath situations because multiple antennas offer a receiver several observations of the same signal. Each antenna experiences a different interference environment. Thus, if one antenna is experiencing a deep fade, it is likely that another has a sufficient signal. Collectively such a system provides a robust link.

Inherently, the antenna diversity scheme requires additional hardware and integration versus a single antenna system. Specifically, the conventional MU utilizing the antenna diversity scheme may include the main antenna configured to both transmit and receive data and a diversity antenna which is conventionally configured to only receive data. Furthermore, with the multiple signals, there is a greater processing demand placed on the receiver which leads to tighter design requirements. However, due to the commonality of the signal paths, a fair amount of circuitry may be shared between the main antenna and the diversity antenna. In addition, signal reliability is paramount and using multiple antennas is an effective way to decrease the number of drop-outs and lost connections.

In a substantially similar manner as the main antenna, the diversity antenna should also be configured to operate in the same frequencies that the main antenna is configured to operate. Accordingly, a conventional diversity antenna may include substantially similar drawbacks. For example, to operate in a first operating frequency that the main antenna is configured to operate, the conventional MU may include a first diversity antenna; to operate in a second operating frequency that the main antenna is configured to operate, the conventional MU may include a second diversity antenna; etc. Therefore, this requires multiple diversity antennas as well to be disposed within the housing of the MU, each diversity antenna requiring respective connections/components. Furthermore, the diversity antenna is a supplemental antenna used in the antenna system of the MU. As such, the diversity antenna is often subject to more constrained physical parameters as less space is available to include this supplemental antenna. Accordingly, the diversity antenna is usually configured for only select ones of the operating frequencies of the main antenna. For example, if the main antenna is configured for four different operating frequencies, the diversity antenna is often configured for only two of the four different operating frequencies (e.g., the two most commonly used among the four).

Accordingly, there is a need for a combined diversity antenna that is capable of operating in multiple frequencies such as two low band frequencies and two high band frequencies so that the combined diversity antenna is capable of being used in global applications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An electronic device comprises a housing; a wireless transceiver disposed within the housing; a main antenna coupled to the transceiver and configured to enable the transceiver to operate in at least four wireless frequency bands; and a diversity antenna coupled to the transceiver, the diversity antenna configured as a planar inverted F-antenna and comprising: a first portion having a first end and a second end, the first portion configured to enable the transceiver to operate using a first low-band frequency of the four frequency bands; a second portion coupled to the first end of the first portion, the second portion configured to enable the transceiver to operate using first and second high-band frequencies of the four frequency bands; and a third portion extending substantially parallel to the first portion, the third portion configured to tune the first portion such that the transceiver operates using a second low-band frequency of the four frequency bands.

The exemplary embodiments may be further understood with reference to the following description and the appended drawings, wherein like elements are referred to with the same reference numerals. The exemplary embodiments describe a combined diversity antenna that includes a plurality of portions configured to enable the transceiver to receive data in a plurality of frequencies. Specifically, a first portion may be configured to operate in a first low-band frequency, a second portion may be configured to operate in a first high-band frequency and a second high-band frequency, and a third portion may be configured to tune the first portion to operate in a second low-band frequency. The exemplary embodiments also describe a switch coupled to the third portion such that the first and second portions operate in their respective frequency bands when the switch is in a first mode and the third portion tunes the first portion to operate in a further frequency band when the switch is in a second mode. The combined diversity antenna, the portions, the high-band and low-band frequencies, and the switch will be discussed in further detail below.

With regard to wireless networks, specifications indicating the operating frequencies of the wireless networks are constantly updated or changed. For example, a first wireless network may have previously only operated on a single low-band frequency and a single high-band frequency. However, the specification for the first wireless network may be changed such that a diversity WAN antenna is required to support four (4) different bands. Specifically, a first band may be a first low-band frequency range between 734-746 MHz, a second low-band frequency range between 869-894 MHz, a first high-band frequency range between 2110-2170 MHz, and a second high-band frequency range between 1930-1990 MHz. In another example, a second wireless network may also be updated such that the four bands described for the first wireless network are also substantially being used whereas the first low-band frequency has a different range between 746-758 MHz. Furthermore, as mobile unit technology advances, an overall volume of the housing may be decreased such that the diversity antenna is only configured to support a limited number of available operating frequencies as an overall size associated with the diversity antenna that would accommodate all the operating frequencies of the main antenna cannot be disposed within the mobile unit. For example, the size of the housing may prevent the diversity antenna from having a further component or further diversity antenna that would enable the transceiver to operate in the further available operating frequencies.

Figure 1:
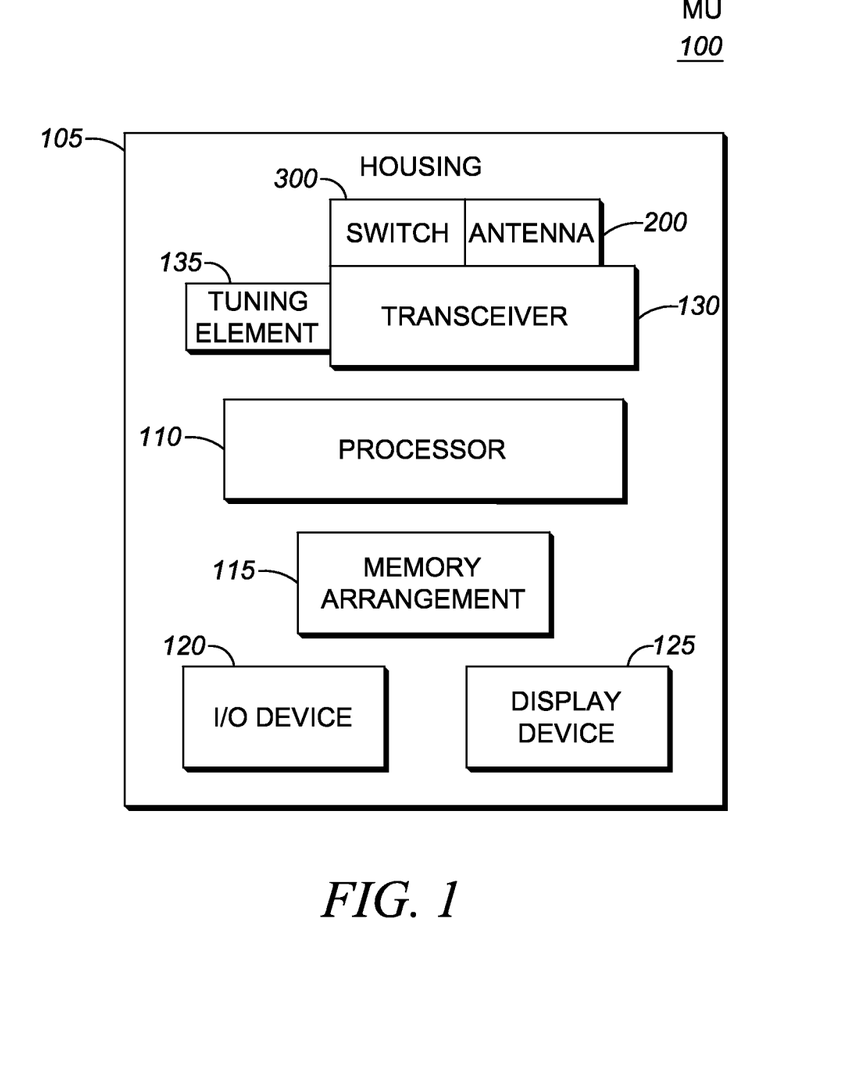
FIG. 1 shows a mobile unit including a diversity antenna in accordance with some embodiments.

FIG. 1 shows a mobile unit (MU) 100 including a combined diversity antenna 200 (hereinafter "combined antenna 200") in accordance with some embodiments. The MU 100 may include a plurality of conventional components. For example, the MU 100 may include a housing 105 that at least partially houses a plurality of electronic components such as a processor 110, a memory arrangement 115, an input/output (I/O) device 120, a display device 125, and a transceiver 130. The transceiver 130 may be coupled to the combined antenna 200 and a tuning element 135. It should be noted that the MU 100 may include further components. For example, the MU 100 may include a main antenna (as will be discussed in further detail below), coupling contacts (not shown) to recharge a portable power supply disposed within the housing 105; an audio output component (e.g., a speaker (not shown)); audio input component (e.g., a microphone (not shown)); etc. According to a further exemplary embodiment, the MU 100 may include a switch 300. The switch 300 will be described in further detail below, particularly with regard to FIG. 3.

The MU 100 may be any electronic device configured to connect to a network. For example, the MU 100 may be a laptop, a cellular phone, a smartphone, a personal digital assistant, a tablet, a barcode scanner, etc. including the transceiver 130 that enables the MU 100 to transmit/receive data from the network via the main antenna and receive data from the communication network via the combined antenna 200. In another example, the MU 100 may represent a stationary device (e.g., a terminal) including a wireless transceiver. Accordingly, it should be noted that the electronic device being the MU 100 is only exemplary. Those skilled in the art will understand that the combined antenna 200 may also be utilized in any electronic device such as the stationary device. The description below will discuss the electronic device being a MU.

In a specific exemplary embodiment, the housing 105 may be a shelter for an electromagnetic compatibility (EMC) new generation Long Term Evolution (LTE) device having dimensions of 136 mm×69 mm×15.9 mm. As will be described in further detail below, the combined antenna 200 may support multiple bands including low-band frequencies utilized for cellular data such as 700 MHz and 850 MHz and high-band frequencies for personal communication services (PCS) such as 1900 MHz and 2100 MHz. Accordingly, the combined antenna 200 enables the MU 100 to operate in a global manner by allowing the MU 100 including the combined antenna 200 to receive data in a LTE network as well as a GSM network. Also as will be described in further detail below, the combined antenna 200 may have appropriate efficiencies in the low-band and high-band frequencies based on a scattering parameter (S-parameter) of S11 (e.g., forward reflection, input-match of impedance) around −6 dB.

Figure 2:
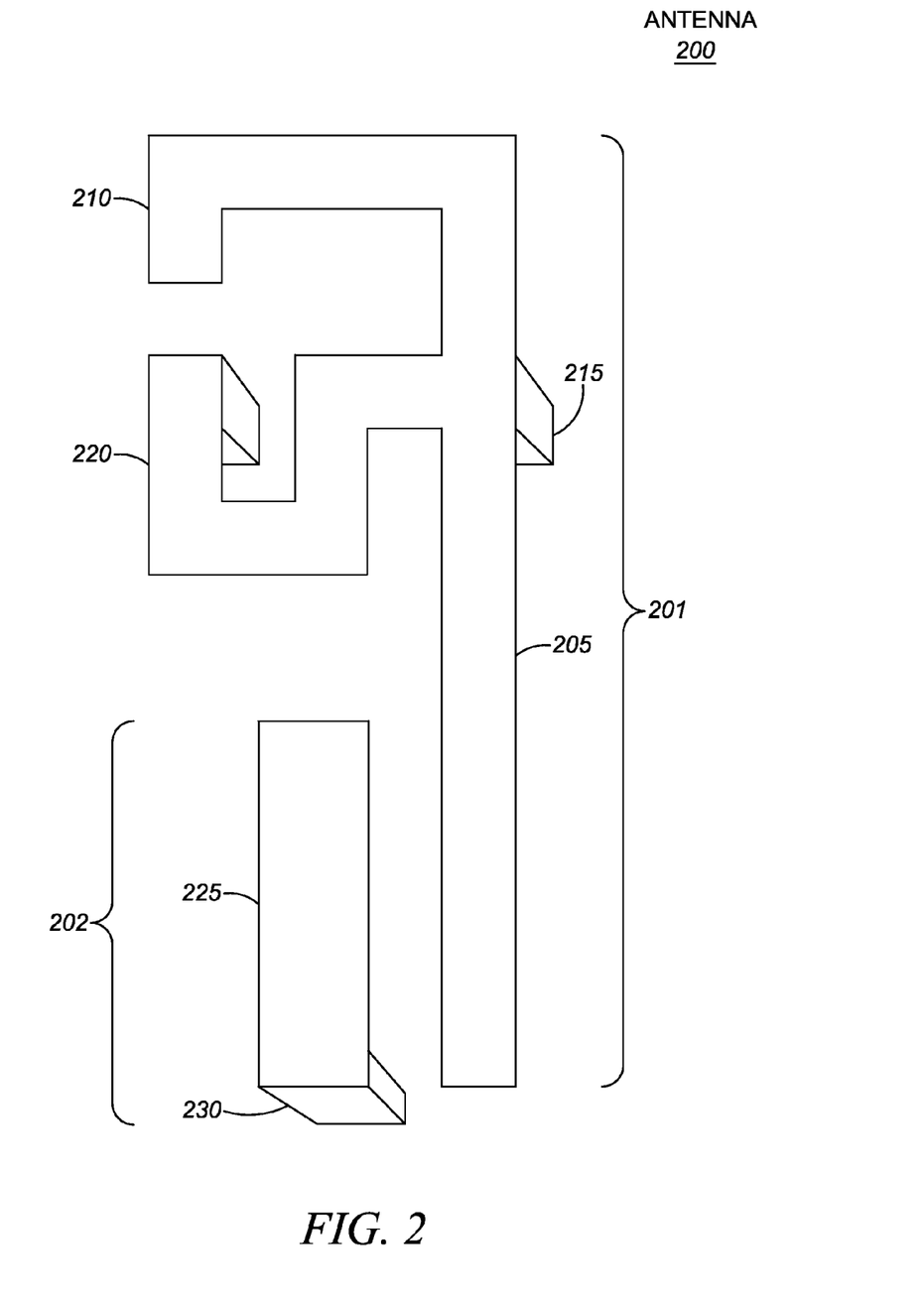
FIG. 2 shows the combined antenna of the mobile unit of FIG. 1 in accordance with some embodiments.

FIG. 2 shows the combined antenna 200 of the MU 100 of FIG. 1 in accordance with some embodiments. The perspective view of FIG. 2 illustrates the combined antenna 200 in isolation. As will be described in further detail below, the combined antenna 200 may be disposed within the housing 105 such that the combined antenna 200 is an internal antenna. As illustrated, the combined antenna 200 includes two main parts. A first part 201 includes a first arm 205, a second arm 210, a feed 215, and a ground 220. A second part 202 includes a third arm 225 and a ground 230. The combined antenna 200 may be oriented as a planar inverted F-antenna (PIFA) and each component thereof may be dimensioned and positioned relative to each other such that it is disposed wholly within the housing 105 as an internal antenna.

The first part 201 and the second part 202 of the combined antenna 200 may be physically separated from one another, but may be electrically coupled or radio frequency (RF) coupled. Specifically, the switch 300 may provide the RF coupling between the first part 201 and the second part 202. With the feed 215 coupling to a printed circuit board (PCB) (discussed in further detail below) and the ground 220 as well as the ground 230 also coupled to the PCB, the RF coupling may be provided.

FIG. 2 constructively shows that the first arm 1, the second arm 2, a portion of the ground 220, and the third arm 225 may be disposed in a substantially planar manner such that these components are all disposed in a longitudinal plane (with respect to the combined antenna 200). The feed 215, the remaining portion of the ground 220, and the ground 230 may be disposed in respective lateral planes that are substantially perpendicular to the longitudinal plane of the aforementioned components of the combined antenna 200. Specifically, the lateral planes may extend from the longitudinal plane in a common direction toward the PCB.

The combined antenna 200 may be designed such that the first arm 205 extends along a longitudinal axis. The second arm 210 may extend substantially perpendicular to the first arm 205 at a first end thereof. For example, the second arm 210 may extend toward an interior of the housing 105. The third arm 225 may extend substantially parallel to the first arm 205. Specifically, the third arm 225 may extend along the first arm 205 from a second end thereof which is opposite the first end. As shown in FIG. 2, the third arm 225 may extend to a length which is less than half a total length of the first arm 205.

Figure 3:
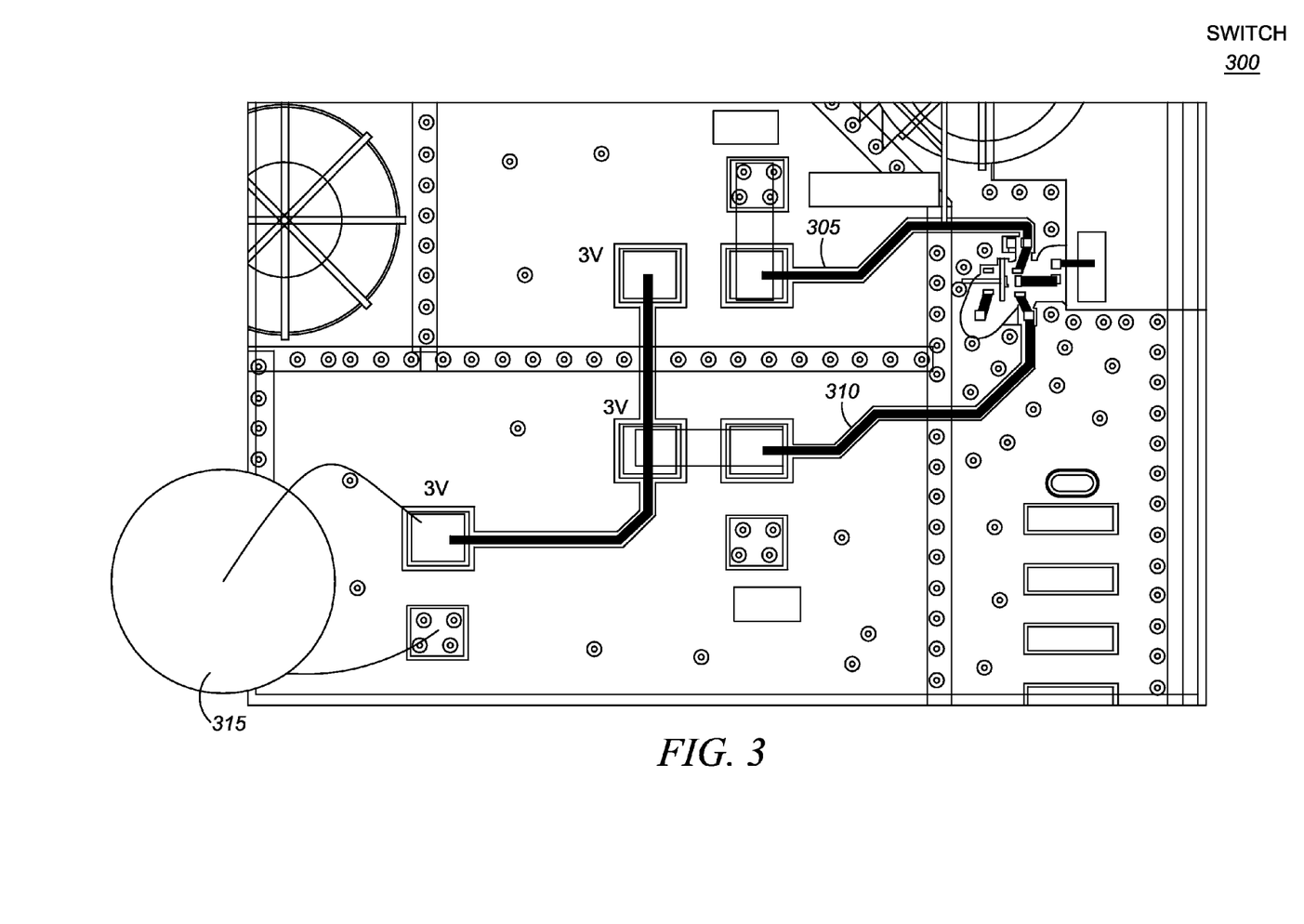
FIG. 3 shows the switch of the mobile unit of FIG. 1 in accordance with some embodiments.

FIG. 3 shows the switch 300 of the MU 100 of FIG. 1 in accordance with some embodiments. The switch 300 may be a component disposed between the ground 230 and the PCB. Accordingly, the switch 300 may be placed in a first mode ("off") or open position for the combined antenna 200 to operate in a first manner and a second mode ("on") or closed position for the combined antenna 200 to operate in a second manner. When the switch 300 is in the first mode, a circuit 305 may be closed such that power drawn from a battery 315 is provided along a first path. For example, the battery 315 may provide an electrical potential of 3V. When the switch 300 is in the second mode, a circuit 310 may be closed such that power drawn from the battery 315 is provided along a second path.

Figure 4:
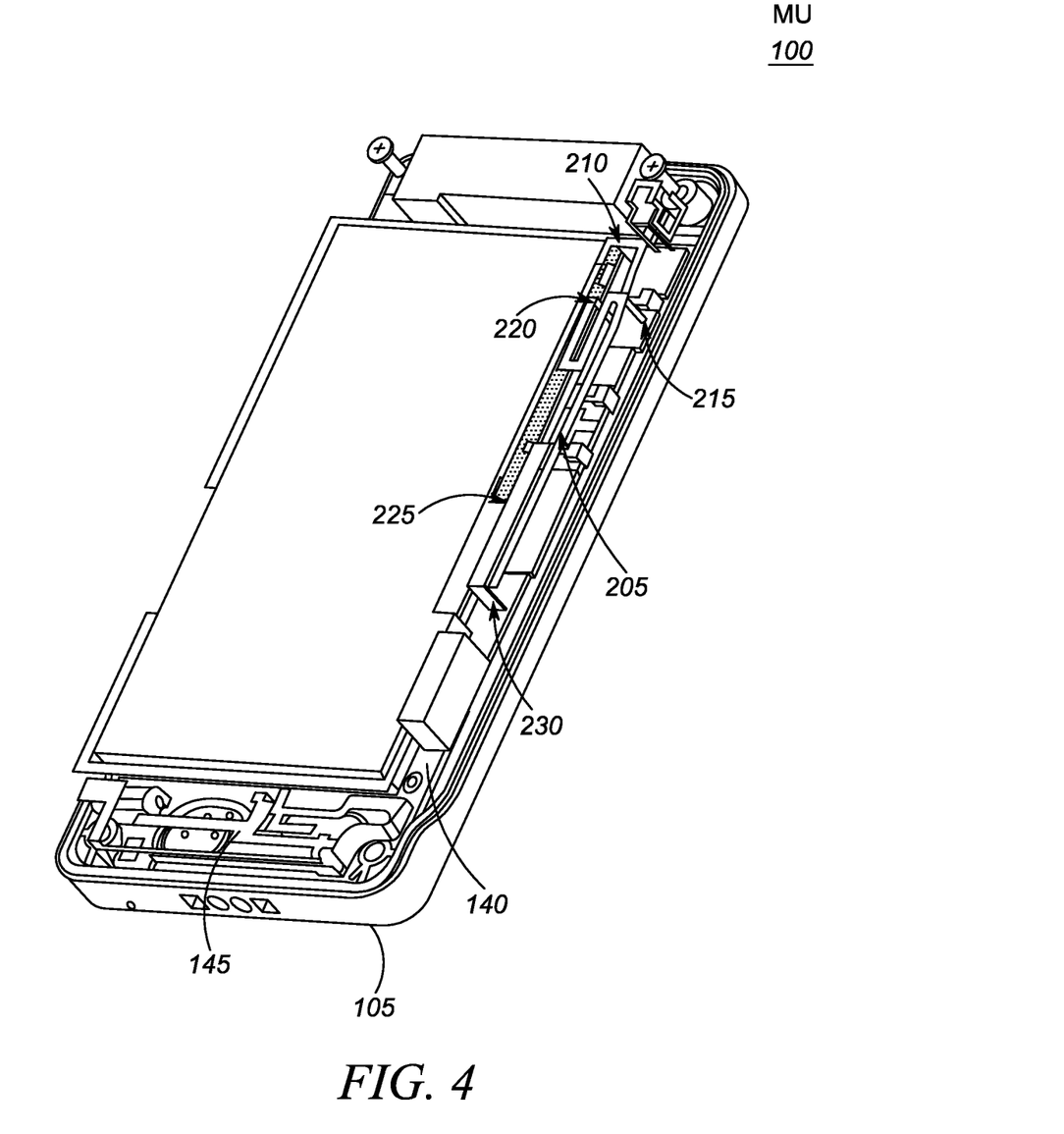
FIG. 4 shows an internal view of the mobile unit of FIG. 1 in accordance with some embodiments.

FIG. 4 shows an internal view of the MU 100 of FIG. 1 in accordance with some exemplary embodiments. The internal view of the MU 100 illustrates a manner in which the components of the MU 100 may be arranged within the housing 105. FIG. 4 also illustrates that the MU includes the PCB 140 and the main antenna 145. As discussed above, the main antenna 145 may be a first part of an antenna system that enables the transceiver 130 to receive and transmit data. Accordingly, the combined antenna 200 is a second part of the antenna system as a diversity antenna that enables the transceiver 130 to receive the data as well. The PCB 140 may be any surface in which the electronic components of the MU 100 may be disposed thereon such that an electrical connection is established therebetween. For example, the processor 110 and the transceiver 130 may be disposed on the PCB 140 such that an electrical connection is established therebetween such that signals from the processor 110 may be transmitted and received by the transceiver 130.

FIG. 4 shows that the main antenna 145 may be disposed in a conventional area within the housing 105. Specifically, the main antenna 145 may be positioned near a top or bottom edge of the MU 100. The combined antenna 200 may be positioned in a substantially perpendicular manner. Specifically, as shown in FIG. 4, the combined antenna 200 may be positioned near a side edge of the MU 100. However, it should be noted that the dispositions of the main antenna 145 and the combined antenna 200 as shown in FIG. 4 is only exemplary. Those skilled in the art will understand that the main antenna 145 and the combined antenna 200 may be positioned in any location within the housing 105. In particular, the main antenna 145 and the combined antenna 200 may be positioned in any location with respect to each other such that the antennas do not generate any interference between each other.

According to the exemplary embodiments, the main antenna 145 may be configured such that the transceiver 130 operates in predetermined operating frequency bands to transmit and receive data. Thus, the main antenna 145 may be configured for the transceiver 130 to operate in a select operating frequency band. When data is to be received, as a diversity antenna, the combined antenna 200 may also be configured to receive the data in the select operating frequency band such that a more reliable wireless link (e.g., improved signal strength for faster download of data, improved voice connection, etc.) is established for the data to be received. The main antenna 145 and the combined antenna 200 may be configured to operate on a plurality of frequency bands. For example, the first arm 205 may be configured to operate at 850 MHz while the second arm 210 may be configured to operate at 1900 and 2100 MHz. The third arm may tune the first arm 205 such that the low-band frequency at which the first arm 205 operates shifts toward the 700 MHz low-band frequency.

When the switch 300 is in the first mode in which the circuit 305 is closed or in the "off" position, the first arm 205 and the second arm 210 are configured to operate in the above noted frequency bands of 850 MHz, 1900 MHz, and 2100 MHz. As no power is supplied to the third arm 225, the third arm 225 is in an idle state. When the switch 300 is in the second mode in which the circuit 310 is closed or in the "on" position, the third arm 225 is supplied power such that it resonates at the 700 MHz frequency band. This effectively lowers the frequency band of 850 MHz with which the first arm 205 normally operates towards the 700 MHz frequency band. Accordingly, the third arm 225 may be a tuning element that tunes the first arm 205 from the low-band frequency of 850 MHz towards the low-band frequency of 700 MHz. In this manner, the combined antenna 200 is configured to operate in four different operating frequency bands: a first high-band frequency of 1900 MHz via the second arm 210, a second high-band frequency of 2100 MHz via the second arm 210, a first low-band frequency of 850 MHz via the first arm 205 when the switch 300 is in the first mode, and a second low-band frequency via the first arm 205 as tuned by the third arm 225 when the switch 300 is in the second mode.

It should be noted that the above described dimensions and orientations of the third arm 225 with respect to the first arm 205 is only exemplary. The combined antenna 200 may be modified in a variety of different manners such that the tuning effect of the third arm 225 is provided. For example, adjusting a RF coupling gap between the first arm 205 and the third arm 225 or adjusting a length of the third arm 225 may provide the necessary tuning effect for the first arm 205 to enable the transceiver 130 to operate in a desired low-band frequency. As discussed above, a first service provider may utilize a low-band frequency range of 734-746 MHz. The third arm 225 may have a first length and/or a first gap with the first arm 205 such that the tuning effect provided by the third arm 225 shifts the ordinary low-band frequency from 850 MHz to within this first desired range. The second service provider may utilize a low-band frequency range of 746-758 MHz. Thus, the third arm 225 may have a second length and/or a second gap with the first arm 205 such that the tuning effect provided by the third arm 225 shifts the ordinary low-band frequency from 850 MHz to within this second desired range.

It should also be noted that the location of the third arm 225 having an end substantially near an end of the first arm 205 (such that both the first arm 205 and the third arm 225 extend in a common direction from these ends) provides the capability of the third arm 225 to tune the first arm 205 as near the resonating frequency of the third arm 225 when the switch 300 is in the second mode or "off" position. Specifically, this location in which the RF coupling is ultimately established utilizes a highest possible RF voltage in order for the third arm 225 to tune the first arm 205 to shift the frequency as low as possible from the 850 MHz low-band frequency toward the 700 MHz low-band frequency.

It should further be noted that the tuning element 135 may provide a fine tuning effect for the first arm 205 and the second arm 210. That is, the tuning element 135 may be utilized to negate detuning effects that are usually experienced with the MU 100. For example, when the MU 100 is placed adjacent a user's head or held within a user's hand, the user introduces electrical interference such that a detuning effect results. The tuning element 135 may provide the fine tuning effect to remove this detuning effect. In contrast, the third arm 225 provides a tuning effect that shifts the first arm 205 from a first low-band frequency range to a second low-band frequency range.

Figure 5A:
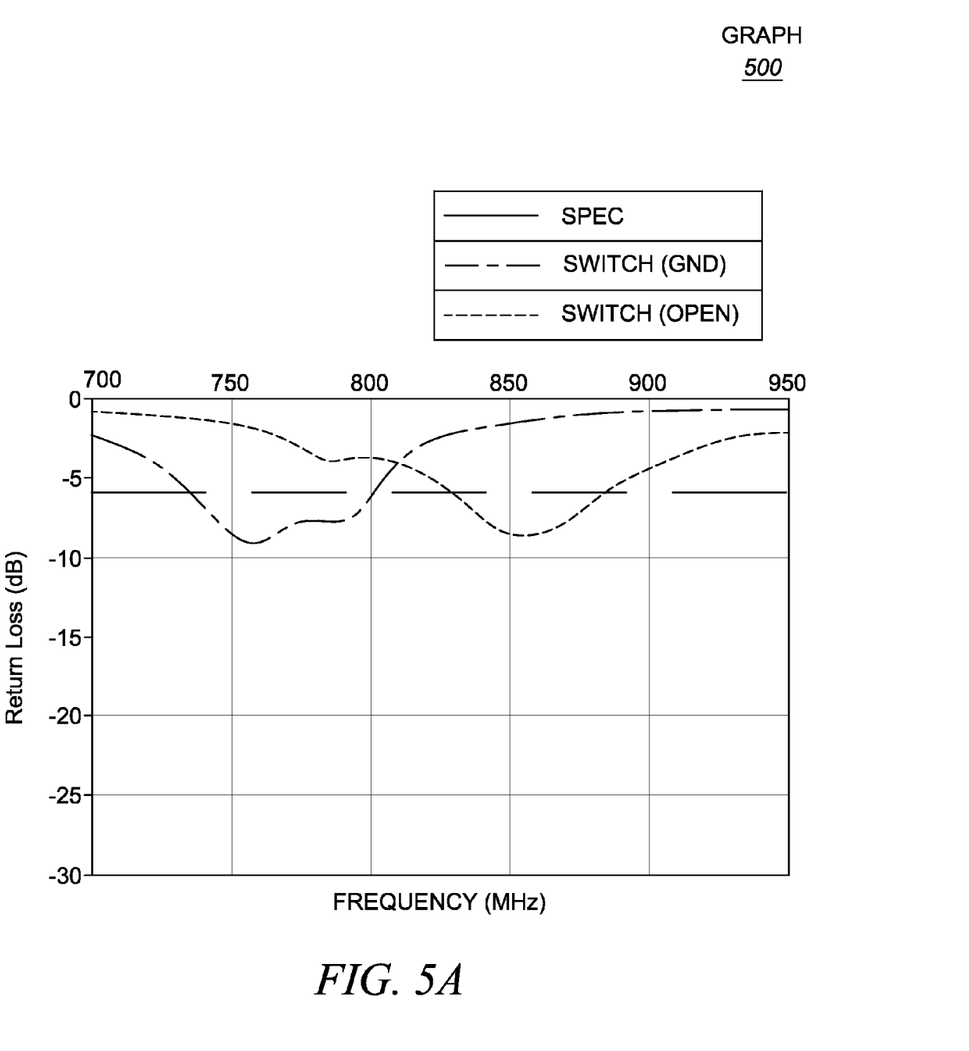
FIG. 5A is a graph of return loss in low band frequencies for the mobile unit of FIG. 1 including the diversity antenna in accordance with some embodiments.
Figure 5B:
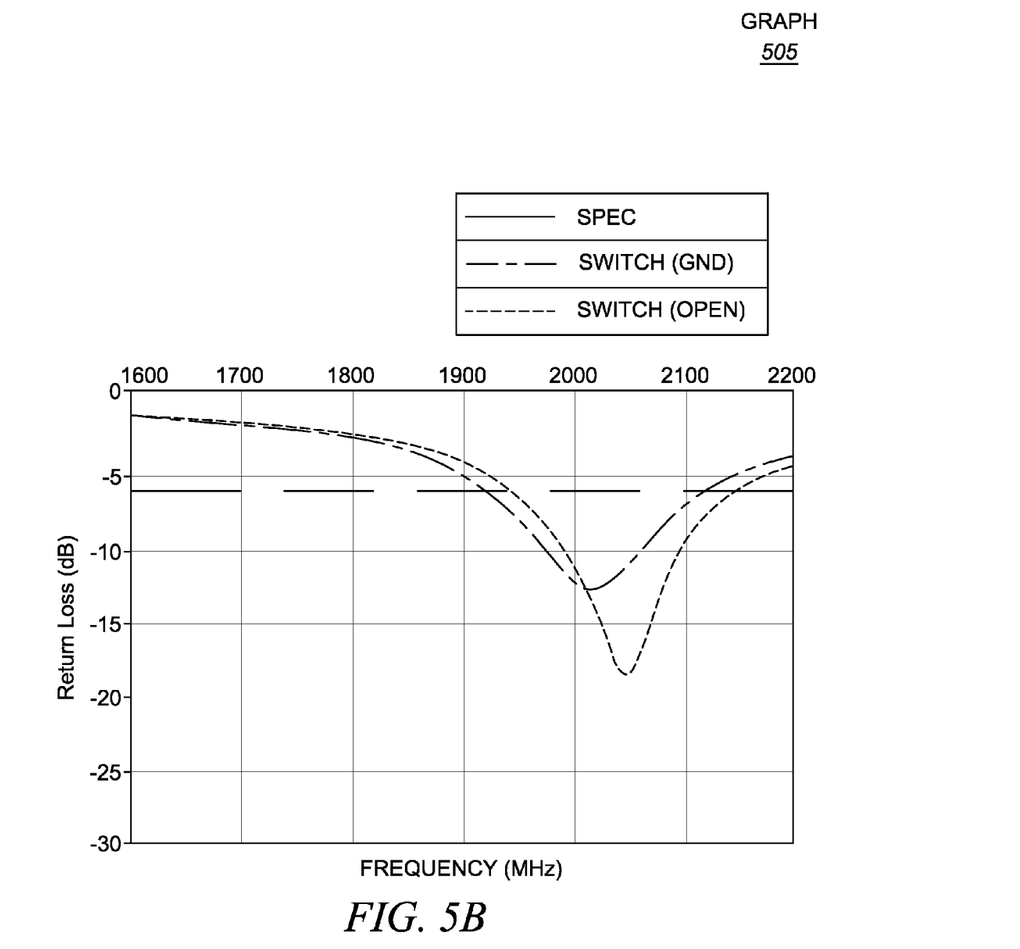
FIG. 5B is a graph of return loss in high band frequencies for the mobile unit of FIG. 1 including the diversity antenna in accordance with some embodiments.

FIG. 5A is a graph 500 of return loss in low band frequencies for the MU 100 of FIG. 1 including the combined antenna 200 in accordance with some embodiments. FIG. 5B is a graph 505 of return loss in high band frequencies for the MU 100 of FIG. 1 including the combined antenna 200 in accordance with some embodiments. Specifically, the graphs 500, 505 illustrate that the return loss as measured in S11 from utilizing the combined antenna 200 is around −6 dB. In particular regard to the graph 500, this illustrates the third arm 225 being utilized in which the dark line relates to when the switch 300 is in the first mode or "off" (open) position and the first arm 225 operates in the normal 850 MHz range while the light line relates to when the switch 300 is in the second mode or "on" (closed) position and the first arm 225 operates in the shifted low-band frequency (approximately 750 MHz in the graph 500). In particular regard to the graph 505, this also illustrates the effect of utilizing the third arm 225 in the high-band frequencies of the second arm 210. The dark arm relates to when the switch 300 is in the first mode or "off" (open) position and the second arm 210 operates in the approximately 2050 MHz range while the light line relates to when the switch 300 is in the second mode or "on" (closed) position and the second arm 210 still operates within the limits of this high-band frequency range (approximately 2000 MHz). Accordingly, the use of the third arm 225 does not adversely affect the manner in which the second arm 210 operates in the high-band frequency range.

Figure 6:
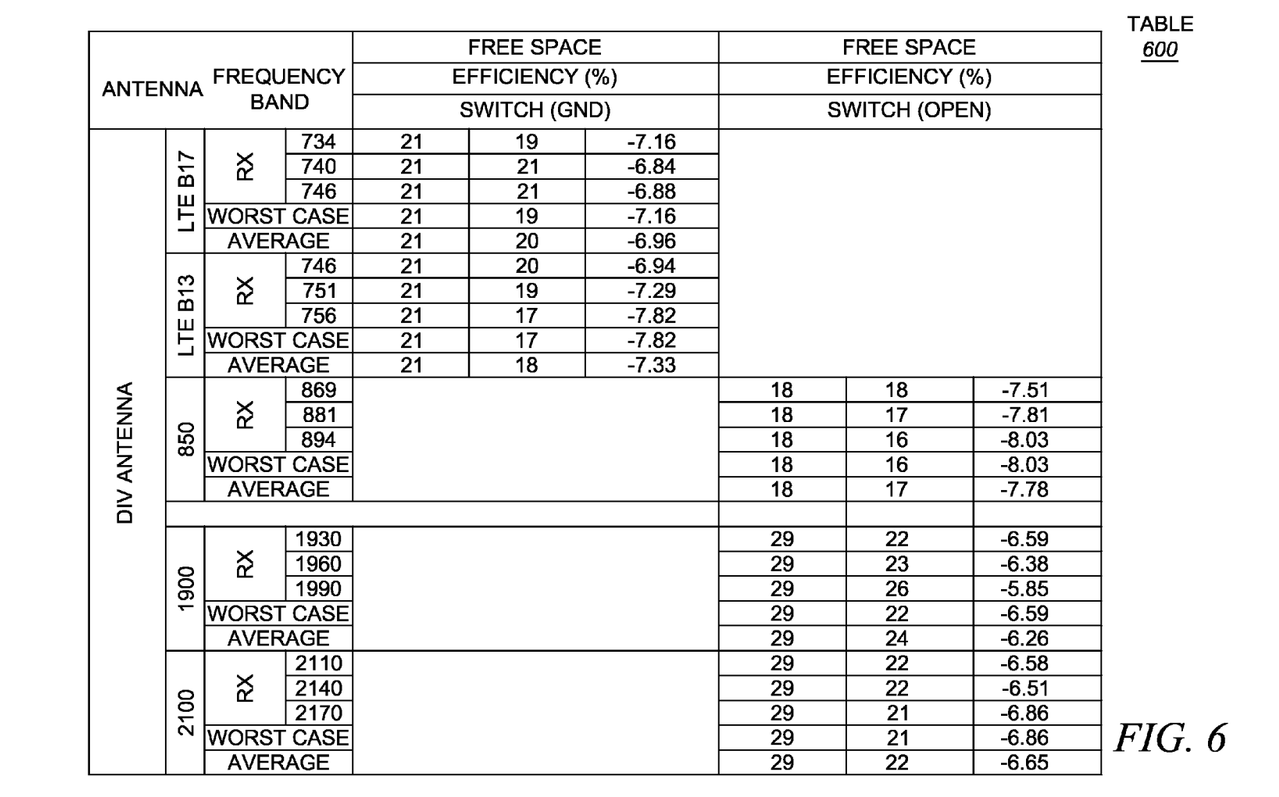
FIG. 6 is a table of efficiencies in low and high band frequencies for the mobile unit of FIG. 1 including the diversity antenna in accordance with some embodiments.

FIG. 6 is a table 600 of efficiencies in low and high band frequencies for the MU 100 of FIG. 1 including the diversity antenna 200 in accordance with some embodiments. Specifically, the efficiencies are illustrated for when the second arm 210 operates in the first high-band frequency and the second high-band frequency, for when the first arm 205 operates in the first low-band frequency, and for when the first arm 205 operates in the second low-band frequency when the switch 300 is in the second mode in which the third arm 225 provides the tuning functionality.

The exemplary embodiments provide a combined diversity antenna that improves a manner in which a transceiver of a mobile unit is able to receive data on select operating frequencies based upon a main antenna. Specifically, the main antenna may enable the transceiver to operate in at least four different frequency bands: a first high-band frequency near 2100 MHz, a second high-band frequency near 1900 MHz, a first low-band frequency near 850 MHz, and a second low-band frequency near 700 MHz. The combined diversity antenna is also configured for the transceiver to receive data on these four different frequency bands. The combined diversity antenna includes a first arm for the first low-band frequency, a second arm for the first and second high-band frequencies, and a third arm that may be activated/deactivated by a switch such that, when activated, the first arm is configured in the second low-band frequency.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises ... a", "has ... a", "includes ... a", "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An electronic device, comprising:
   a housing;
   a wireless transceiver disposed within the housing;
   a main antenna coupled to the transceiver and configured to enable the transceiver to operate in at least four wireless frequency bands; and
   a diversity antenna coupled to the transceiver, the diversity antenna configured to receive signals in at least the four wireless frequency bands and configured as an inverted F-antenna, the diversity antenna comprising:
      a first portion having a first end and a second end, the first portion configured to enable the transceiver to receive a signal in a first low-band frequency of the four frequency bands;
      a second portion connected to the first end of the first portion, the second portion configured to enable the transceiver to receive signals in first and second high-band frequencies of the four frequency bands;
      a third portion RF coupled to the first portion when the third portion is connected to ground, the third portion configured to tune the first portion such that the transceiver receives a signal in a second low-band frequency of the four frequency bands; and
      a switch connected between the third portion and the ground, wherein when the switch is open, the first portion enables the transceiver to receive the signal in the first low-band frequency, and wherein when the switch is closed, the third portion tunes the first portion to enable the transceiver to receive the signal in the second low-band frequency.

2. The electronic device of claim 1, wherein the first high-band frequency is in a 2100 MHz frequency band, the second high-band frequency is in a 1900 MHz frequency band, the first low-band frequency is in a 850 MHz frequency band, and the second low-band frequency is in a 700 MHz frequency band.

3. The electronic device of claim 1, wherein the third portion extends from a first end to a second end in which the first end of the third portion is substantially adjacent to the second end of the first portion.

4. The electronic device of claim 3, wherein a disposition of the first end of the third portion relative to the second end of the first portion generates a highest radio frequency (RF) voltage.

5. The electronic device of claim 1, further comprising:
   a printed circuit board (PCB) comprising;
      a feed connected to the first portion;
      a first ground connected to the first portion; and
      a second ground connected to the third portion through the switch.

6. The electronic device of claim 1, wherein the first portion and the third portion are separated by a gap, wherein the first portion and the third portion are RF coupled when the third portion is connected to the ground.

7. The electronic device of claim 6, wherein the third portion tunes the first low-band frequency of the first portion in a predetermined manner as a function of the gap and a length of the third portion.

8. The electronic device of claim 1, further comprising:
   a tuning element configured to fine tune the first and second portions to remove a detuning effect.

9. An antenna system of a wireless device, comprising:
   a main antenna coupled to the transceiver and configured to enable the transceiver to operate in at least four wireless frequency bands; and
   a diversity antenna coupled to the transceiver, the diversity antenna configured to receive signals in at least the four wireless frequency bands and configured as an inverted F-antenna, the diversity antenna comprising:
      a first portion having a first end and a second end, the first portion configured to enable the transceiver to receive a signal in a first low-band frequency of the four frequency bands;
      a second portion connected to the first end of the first portion, the second portion configured to enable the transceiver to receive signals in first and second high-band frequencies of the four frequency bands;
      a third portion RF coupled to the first portion when the third portion is connected to ground, the third portion configured to tune the first portion such that the transceiver receives a signal in a second low-band frequency of the four frequency bands; and
      a switch connected between the third portion and the ground, wherein when the switch is open, the first portion enables the transceiver to receive the signal in the first low-band frequency, and wherein when the switch is closed, the third portion tunes the first portion to enable the transceiver to receive the signal in the second low-band frequency.

10. The antenna system of claim 9, wherein the first high-band frequency is in a 2100 MHz frequency band, the second high-band frequency is in a 1900 MHz frequency band, the first low-band frequency is in a 850 MHz frequency band, and the second low-band frequency is in a 700 MHz frequency band.

11. The antenna system of claim 9, wherein the third portion extends from a first end to a second end such that the first end of the third portion is substantially adjacent to the second end of the first portion.

12. The antenna system of claim 11, wherein a disposition of the first end of the third portion relative to the second end of the first portion generates a highest radio frequency (RF) voltage.

13. The antenna system of claim 9, further comprising:
a printed circuit board (PCB) comprising:
a feed connected to the first portion;
a first ground connected to the first portion; and
a second ground connected to the third portion through the switch.

14. The antenna system of claim 9, wherein the first portion and the third portion are separated by a gap, wherein the first portion and the third portion are RF coupled when the third portion is connected to the ground.

15. The antenna system of claim 14, wherein the third portion tunes the first low-band frequency of the first portion in a predetermined manner as a function of the gap and a length of the third portion.

16. A diversity antenna of a wireless device, the wireless device including a wireless transceiver and a main antenna, the diversity antenna, comprising:
a first portion having a first end and a second end, the first portion configured to enable the transceiver to receive a signal in a first low-band frequency of four frequency bands in which the transceiver is enabled to operate via the main antenna;
a second portion connected to the first end of the first portion, the second portion configured to enable the transceiver to receive signals in first and second high-band frequencies of the four frequency bands;
a third portion RF coupled to the first portion when the third portion is connected to ground, the third portion configured to tune the first portion such that the transceiver receives a signal in a second low-band frequency of the four frequency bands; and
a switch connected between the third portion and the ground, wherein when the switch is open, the first portion enables the transceiver to receive the signal in the first low-band frequency, and wherein when the switch is closed, the third portion tunes the first portion to enable the transceiver to receive the signal in the second low-band frequency.

17. The diversity antenna of claim 16, wherein the first high-band frequency is in a 2100 MHz frequency band, the second high-band frequency is in a 1900 MHz frequency band, the first low-band frequency is in a 850 MHz frequency band, and the second low-band frequency is in a 700 MHz frequency band.

18. The diversity antenna of claim 16, further comprising:
a printed circuit board (PCB) comprising:
a feed connected to the first portion;
a first ground connected to the first portion; and
a second ground connected to the third portion through the switch.

19. The diversity antenna of claim 16, wherein the first portion and the third portion are separated by a gap, wherein the first portion and the third portion are RF coupled when the third portion is connected to the ground.

20. The diversity antenna of claim 19, wherein the third portion tunes the first low-band frequency of the first portion in a predetermined manner as a function of the gap and a length of the third portion.

* * * * *